United States Patent Office 3,169,782
Patented Feb. 16, 1965

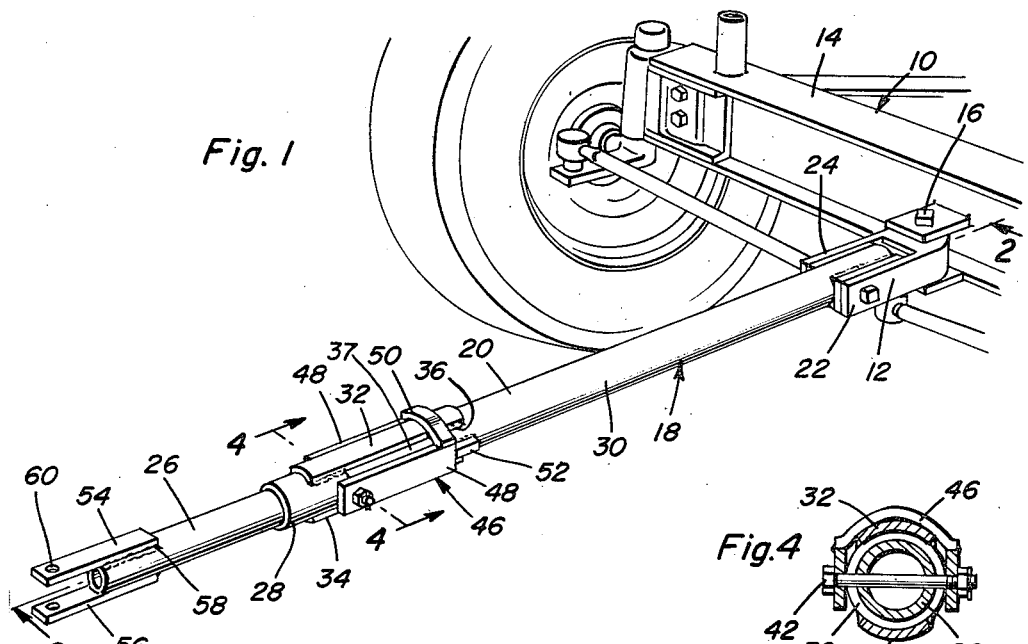
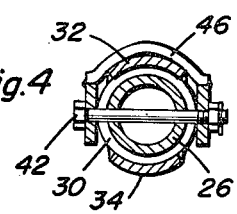
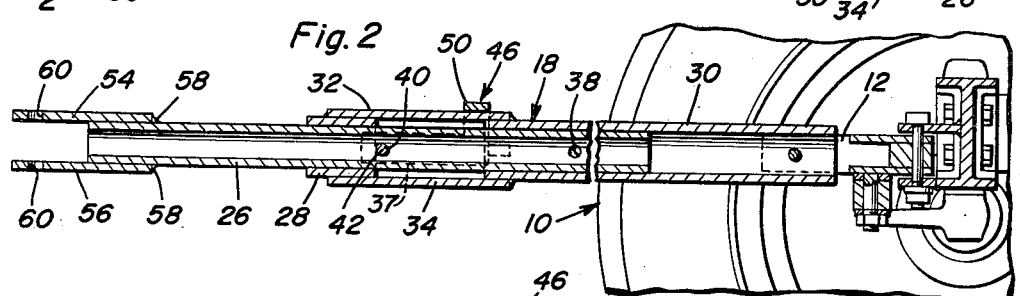
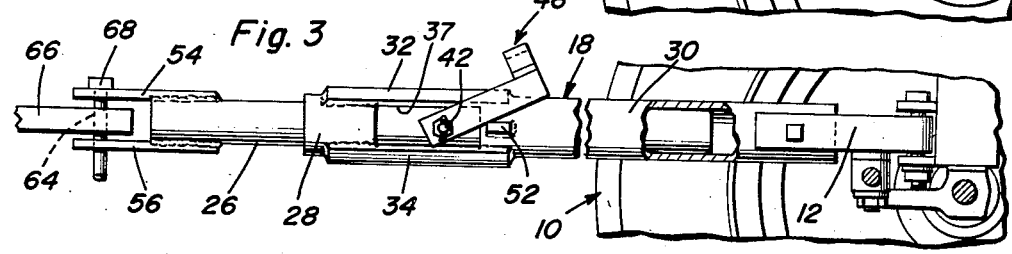
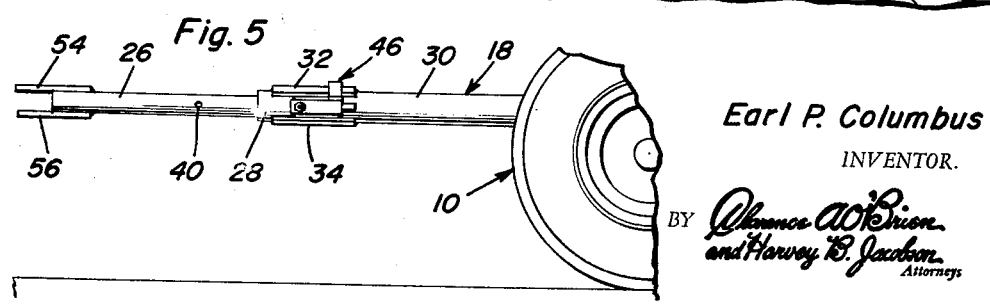
Earl P. Columbus
INVENTOR.

3,169,782
AUTOMATIC TELESCOPING TRAILER TONGUE
Earl P. Columbus, 2002 Russell Ave. N.,
Minneapolis, Minn.
Filed Aug. 30, 1963, Ser. No. 305,586
3 Claims. (Cl. 280—478)

This invention relates to a novel and useful automatic telescoping trailer tongue including telescoped sections and more specifically to a trailer tongue including means for releasably securing the telescoped sections thereof against longitudinal extension or retraction relative to each other, which releasable means includes means for automatically rendering the releasable means operative to lock said sections against longitudinal shifting relative to each other upon extension of the trailer tongue to the fully extended position.

By this construction, the telescoping trailer tongue may be utilized to compensate for slight variations in the position of a draft vehicle relative to the trailer when pivotally securing the forward end of the trailer tongue to the pulling or draft vehicle. Then, as the draft vehicle moves forward, the telescopic trailer tongue is extended to the fully extended position whereupon the telescoped sections thereof will be automatically locked against further longitudinal extension or contraction relative to each other.

The main object of this invention is to provide an automatic telescoping trailer tongue including means for automatically locking the telescoped sections thereof in the fully extended position upon movement of the telescoped sections from a full or partially retracted position to the full extended position.

A further object of this invention, in accordance with the immediately preceding object, is to provide a telescoping trailer tongue including telescoped tubular sections which may be rotated relative to each other about their longitudinal axes and including coacting means limiting rotation of the telescoped tubular members relative to each other to less than a rotational displacement of forty-five degrees.

A final object of this invention to be specifically enumerated herein is to provide an automatic telescoping trailer tongue constructed in accordance with the preceding objects which will conform to conventional forms of manufacture, be of simple construction and easy to use so as to provide a device that will be economically feasible, long lasting and relatively trouble-free in operation.

These together with other objects and advantges which will become subsequently apparent reside in the details of construction and operation as more fully hereinafter described and claimed, reference being had to the accompanying drawings forming a part thereof, wherein like numerals refer to like parts throughout, and in which:

FIGURE 1 is a fragmentary perspective view of the forward end of a conventional form of farm trailer shown with the automatic telescoping trailer tongue of the instant invention operatively associated therewith;

FIGURE 2 is a longitudinal vertical sectional view taken substantially upon a plane indicated by the section line 2—2 of FIGURE 1 with portions of the trailer tongue being broken away;

FIGURE 3 is a side elevational view of the embodiment illustrated in FIGURE 2 of the drawings with the trailer tongue in a partially retracted position and parts of the trailer tongue being broken away and shown in section;

FIGURE 4 is a somewhat enlarged transverse vertical sectional view taken substantially upon the plane indicated by the section line 4—4 of FIGURE 1; and FIGURE 5 is a fragmentary side elevational view of the embodiment illustrated in FIGURE 1 and on somewhat of a reduced scale showing the manner in which the effective length of the automatic telescoping trailer tongue may be adjusted when the telescoped sections of the trailer tongue are locked in their fully extended positions.

Referring now more specifically to the drawings the reference numeral 10 generally designates a conventional form of farm tractor including a bifurcated steering block 12 which is pivotally mounted from the front cross beam or axle 14 of the trailer 10 by means of a pivot fastener 16.

The automatic telescoping trailer tongue of the instant invention is generally designated by the reference numeral 18 and includes an outer tubular member 20 which has its rear end pivotally secured between the furcations 22 and 24 of the bifurcated steering block 12 and an inner tubular member 26 having its rear end telescopically and rotatably received in the forward end of the outer tubular member 20.

The outer tubular member 20 includes a forward portion 28 which is secured to the rear portion 30 by means of a pair of upper and lower straps 32 and 34 secured to the front and rear portions 28 and 30 in any convenient manner such as by welding 36 and defining a pair of longitudinal and diametrically opposite slots 37 therebetween extending between the forward and rear portions 28 and 30 of the tubular member 20.

The spacing between the straps 32 and 34 defines a generally diametric slot extending through the outer member 20 and spaced from the forward end of the latter. The inner tubular member 26 is provided with two pairs of diametrically opposite radial bores 38 and 40 and a pivot fastener or pin 42 is secured through one pair of the bores 38 or 40 and has its opposite ends extending outwardly of the slot defined between the straps 32 and 34.

A movable locking member generally referred to by the reference numeral 46 includes a pair of elongated elements 48 which are pivotally secured with one pair of corresponding ends to the pivot pin 42. The other pair of ends of the elements 48 are interconnected by means of a laterally projecting bight portion 50 defining a saddle adapted for embracing engagement with the upper portion of the outer tubular member 20 defined by the rear end of the strap 32.

The outer tubular member 20 has a pair of radially outwardly projecting and diametrically opposite abutments 52 secured thereto in any convenient manner and the abutments 52 are disposed immediately rearwardly of the slot defined between the straps 32 and 34 and are adapted to be engaged by the free ends of the elements 48 when the movable locking member 46 is in its forwardmost position with the pivot fastener 42 abutting against the front portion 28 of the outer tubular member 20.

It will be noted that the slot defined between the straps 32 and 34 has a greater width than the diameter of the pivot fastener 42 and therefore that the inner tubular member 26 may be oscillated relative to the outer tubular member 20 about its longitudinal axis. It is to be understood that the oscillation of the inner tubular member relative to the outer tubular member is limited to less than a rotational displacement of forty-five degrees.

The forward end of the inner tubular member 26 is provided with a pair of strap members 54 and 56 which are secured to the forward end of the inner tubular member 26 in any convenient manner such as by welding 58 at one pair of corresponding ends. The other pair of corresponding ends of the straps 54 and 56 are suitably apertured as at 60 and project forwardly of the forwardmost end of the inner tubular member 26 and are adapted to be pivotally secured to a suitable draft vehicle.

In operation, when it is desired to couple the telescoping trailer tongue 18 to a draft vehicle, the locking member 46 is raised to the position illustrated in FIGURE 3 of the drawings and the inner tubular section 26 is telescoped into the outer tubular member 30. Then, the draft vehicle may be backed up to the trailer 10. The trailer tongue 18 may then be extended a requisite amount within the limits of the slots defined between the straps 32 and 34 for coupling to the draft vehicle, as shown in FIGURE 3 of the drawings. Then, as the draft vehicle moves forward and away from the trailer 10, the locking member 46 will slide along the abutments 52 until such time as the free ends of the elements 48 pass forwardly of the abutments 52 and are thereby allowed to drop down to the generally horizontally disposed positions illustrated in FIGURES 1, 2, and 5 of the drawings. In this position, the elements 48 prevent longitudinal retraction of the telescoping trailer tongue and thereby assure a rigid connection between the draft vehicle and the trailer 10.

Should the trailer be disposed on substantially level ground and the draft vehicle be disposed on an incline tilting the draft vehicle to one side or the other, the inner tubular member 26 may be oscillated slightly relative to the outer tubular member 20 in order to properly align the apertures 60 in the straps 54 and 56 with the aperture 64 formed in the towing hitch 66 of the draft vehicle in order that the pivot pin 58 may be passed through the apertures 64 and 60.

If it is desired to increase the distance between the draft vehicle and the trailer 10, the pivot pin 42 may be removed from the pair of bores 40 in order that the inner tubular member 26 may be extended to a position with the pairs of bores 38 aligned with the slot defined between the straps 32 and 34. Then, the pivot fastener 42 may again be secured through the locking member 46 and the inner tubular member 26.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An automatic telescoping generally horizontally disposed trailer tongue comprising an outer tubular member and an inner elongated member having one end snugly and slidably disposed in a first end of said outer member, means carried by the second end of said outer member adapted to be pivotally secured to one vehicle and means carried by the other end of said inner member adapted to be pivotally secured to another vehicle, the first end of said outer member having a pair of horizontally aligned, diametrically opposite and longitudinally extending slots formed therein, said one end of said inner member having a plurality of diametric bores formed therethrough and spaced longitudinally therealong and selectively registrable with said slots, an abutment and pivot pin secured through a selected one of said bores and having its opposite end portions slidably received in said slots, said opposite end portions being engageable with the portions of said outer member defining the remote ends of said slots to limit reciprocation of said inner member relative to said outer member, a generally U-shaped locking member including a pair of horizontally aligned, generally parallel and elongated elements disposed on opposite sides of the first end of said outer member and pivotally secured to said opposite end portions at one pair of corresponding ends and interconnected at the other pair of corresponding ends by means of a saddle portion extending transversely of and engageable with the upper surface of said outer member, and a pair of laterally outwardly projecting abutments carried by opposite sides of said outer member and engageable by the end faces of said other pair of corresponding ends of said elongated elements when said abutment pin is disposed in the ends of said slots adjacent the terminal end of said first end of said outer member to prevent axial shifting of said inner member toward said second end of said outer member.

2. The combination of claim 1 wherein said opposite end portions of said pivot pin are loosely received in said slots whereby said inner member may be appreciably oscillated about its longitudinal axis relative to said outer member.

3. The combination of claim 1 wherein said outer member includes first and second axially spaced and aligned portions, a pair of elongated longitudinally extending upper and lower straps extending and rigidly secured between said first and second portions, the vertical spacing between corresponding longitudinal edge portions of said straps defining said slots.

References Cited in the file of this patent
UNITED STATES PATENTS

| | | |
|---|---|---|
| 2,582,595 | Leveke | Jan. 15, 1952 |
| 2,805,082 | Erickson | Sept. 3, 1957 |
| 2,818,276 | Sprang | Dec. 31, 1957 |
| 3,014,738 | Kasten | Dec. 26, 1961 |
| 3,116,076 | Zingsheim | Dec. 31, 1963 |